United States Patent
Yang et al.

(10) Patent No.: US 8,433,359 B2
(45) Date of Patent: Apr. 30, 2013

(54) UPLINK POWER CONTROL SCHEME

(75) Inventors: Rongzhen Yang, Shanghai (CN); Wei Guan, Hyattsville, MD (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 12/630,673

(22) Filed: Dec. 3, 2009

(65) Prior Publication Data

US 2011/0136448 A1 Jun. 9, 2011

(51) Int. Cl.
*H04B 7/00* (2006.01)
(52) U.S. Cl.
USPC ............... 455/522; 455/68; 455/69; 455/135; 455/161.3
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | | |
|---|---|---|---|---|
| 6,657,982 | B1 * | 12/2003 | Fong et al. ..................... | 370/336 |
| 8,150,446 | B2 * | 4/2012 | Huan ............................. | 455/522 |
| 2005/0105483 | A1 * | 5/2005 | Uehara et al. ................. | 370/315 |
| 2006/0116155 | A1 * | 6/2006 | Medvedev et al. ............ | 455/522 |
| 2006/0153309 | A1 | 7/2006 | Tang et al. | |
| 2006/0234642 | A1 * | 10/2006 | Baum et al. ................. | 455/67.13 |
| 2006/0268809 | A1 * | 11/2006 | Ho et al. ........................ | 370/342 |
| 2008/0032732 | A1 * | 2/2008 | Hosein ........................... | 455/522 |
| 2008/0200203 | A1 * | 8/2008 | Malladi et al. ................ | 455/522 |
| 2008/0256410 | A1 * | 10/2008 | Park et al. ...................... | 714/748 |

FOREIGN PATENT DOCUMENTS

| | | |
|---|---|---|
| KR | 10-2009-0033421 | 4/2009 |
| WO | WO 2007-142939 | 12/2007 |

OTHER PUBLICATIONS

International Search Report and Written Opinion for International Patent Application No. PCT/US2010/050018, Mailed May 31, 2011, 9 pages.
Yih-Shen Chen et al., Joint Power Control and link adaptation scheme for IEEE 802.16m, IEEE 802.16 Broadband Wireless Access Working Group, Jul. 7, 2008, 4 pages.
Zhaohua Lu et al., Power Control Based on Interference Management for Uplink, IEEE 802.16 Broadband Wireless Access Working Group, Jul. 7, 2008, 3 pages.
Sophie Vrzic et al., Proposal for IEEE 802.16m Uplink Power Control, IEEE 802.16m -08/024—Call for Contributions on Project 802.16m System Description Document (SDD), on the topic of "UL Power Control," Jul. 7, 2008, 12 pages.
Fan Wang et al., IEEE 802.16m UL Fractional Power Control, Jun. 7, 2008, 6 pages.
Xiaoyi Wang et al., Interference Constraint Power Control, IEEE 802.16m-08/024: Call for Contributions on Project 802.16m System Description Document (SDD), Jul. 7, 2008, 8 pages.

(Continued)

*Primary Examiner* — Dominic E Rego
(74) *Attorney, Agent, or Firm* — Kacvinsky Daisak PLLC

(57) ABSTRACT

An uplink power control technique may include a simplified maximum sector throughput (SMST) and a generalized maximum sector throughput (GMST). The SMST and GMST techniques may be used to determine a maximum sector throughput and cell-edge throughput to enhance the overall efficiency of the communication system. The uplink power control technique may determine the optimal uplink power value without collecting interference over thermal noise and without computing the individual channel losses in each neighboring sector.

20 Claims, 6 Drawing Sheets

OTHER PUBLICATIONS

Ali Taha Koc et al., Uplink Power Control Recommendations for IEEE 802.16m, IEEE 802.16m-08/016r1 Call for System Description Document (SDD) Comments and Contributions, on the topic of "Uplink power control," Jul. 7, 2008, 18 pages.

Jihyung Kim et al., Uplink Power Control in the Base Station, IEEE 802.16m-08/024: Call for Contributions on Project 802.16m System Description Document (SDD) (Jun. 18, 2008), Power Control, Jul. 7, 2008, 6 pages.

Jeongho Park et al., Uplink Power Control in 802.16m, IEEE 802.16m-08/024, "Call for Contributions on Project 802.16m System Description Document (SDD)", on topic of 'Power Control', Jul. 7, 2008, 15 pages.

Kanchei (Ken) Loa et al., Power Control in 802.16m, IEEE 802.16 Broadband Wireless Access Working Group, Jul. 7, 2008, 4 pages.

Juejun Liu et al., Uplink Power Control of 16m, IEEE 802.16 Broadband Wireless Access Working Group, Jul. 7, 2008, 6 pages.

Dong-Cheol Kim et al., Uplink Power Control Design—Considerations and Mechanism, IIEEE 802.16 Broadband Wireless Access Working Group, Jul. 7, 2008, 13 pages.

\* cited by examiner

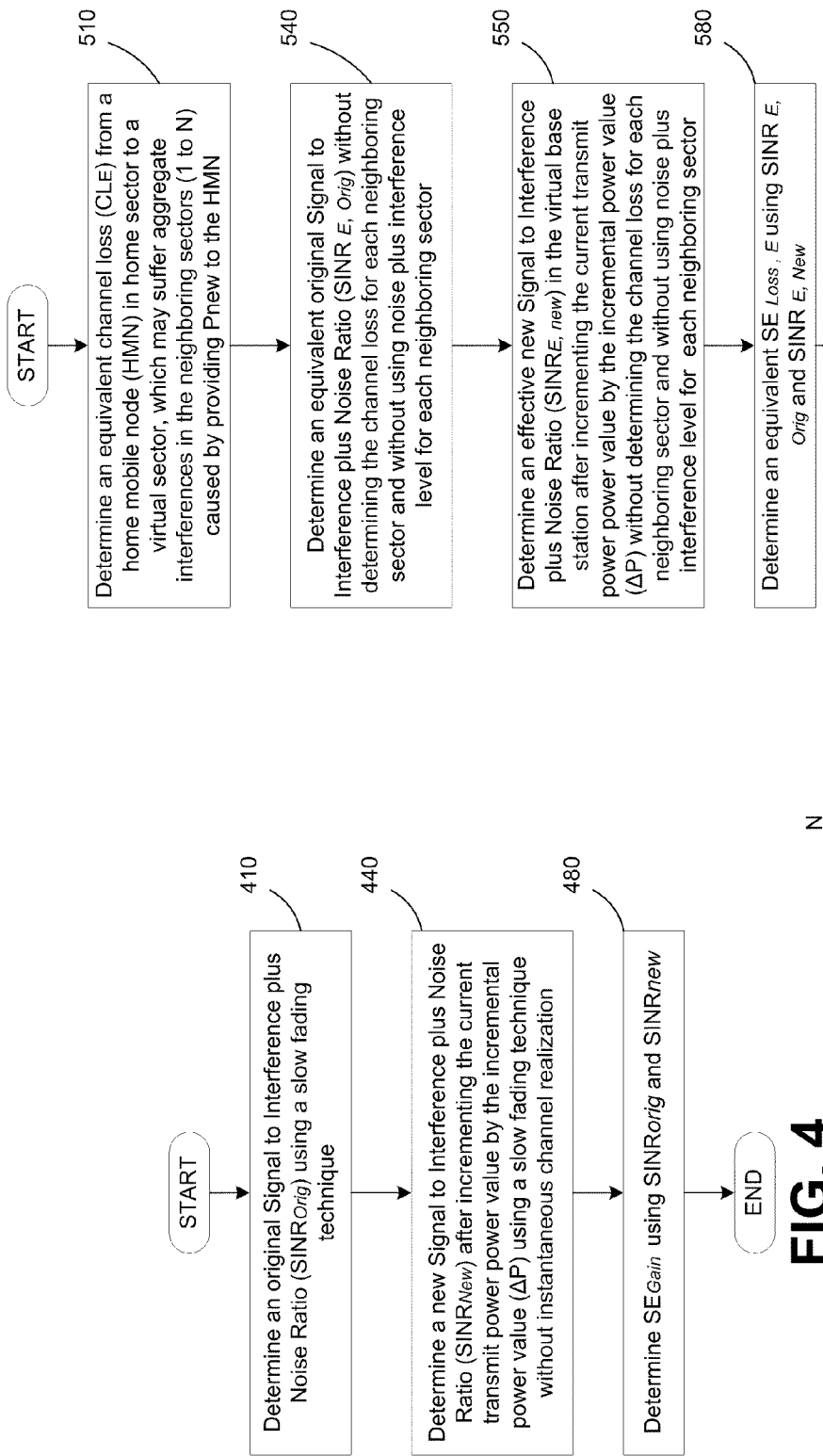

| UPLC Technique 810 | Sector SE (bits/s/Hz) 850 | 5% Cell edge SE (bits/s/Hz) 880 |
|---|---|---|
| T1: Max Power | 0.5787 (2.2163 Mbps) | 0.005 (19.3 kbps) |
| T2: $SNR_{target}$ =7db | 0.4294 (1.6444 Mbps) | 0.005 (19.3 kbps) |
| T3: SMST + $SINR_{Min}$ = 0db + $SINR_{Max}$ = 20db | 0.7486 (2.867 Mbps) | 0.0199 (76.3 kbps) |
| T4: SMST + $IoT_{Limit}$ = 7db | 0.7609 (2.9142 Mbps) | 0.0082 (31.5 kbps) |
| T5: SMST + $SINR_{Min}$ = 0db + $IoT_{Limit}$ = 7db | 0.7247 (2.7754 Mbps) | 0.0216 (82.6 kbps) |
| T6: GMST with $\alpha$ = -0.9; $\beta$ = -0.64; and $\gamma$ = 0.9 | 0.6426 (2.4612 Mbps) | 0.0339 (129.8 kbps) |

FIG. 8

| Parameter List 610 | Value 650 |
|---|---|
| Bandwidth | 10MhZ |
| Frequency Reuse | 1 |
| Cell Deployment | 3 sectors/cell; 19 cell wrap-around |
| Number of Users | 10 per sector |
| No. of strong interference | 8 |
| Channel model | E-ITU Ped B 3km/h |
| Permutation mode | WiMax UL PUSC |
| Uplink symbols | 15 |
| Site-to-Site distance | 500 meters |

FIG. 6

UPLINK POWER CONTROL SCHEME

BACKGROUND

Uplink power control may be used to control the transmit power level to balance the link performance, terminal battery power, and reduce the inter-sector co-channel interference in uplink. Techniques such as open loop power control (OLPC) and closed loop power control (CLPC) may be used to control uplink power. Open loop power control may be based on channel loss estimation and the broadcasted information and is generally used for slow power control. Closed loop power control may be used for fast power control with high signaling overhead induced by unicast control signal.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a flow-chart, which depicts a technique to determine spectral efficiency (SE) gain in a home sector supporting a home mobile node in accordance with one embodiment.

FIG. 5 is a flow-chart, which depicts a technique to determine spectral efficiency (SE) loss in a virtual sector representing neighboring nodes in accordance with one embodiment.

FIG. 6 illustrates a table 600, which includes parameter-value combination that reflects the performance of a maximum sector throughput technique in accordance with one embodiment.

FIG. 8 illustrates a table 800 in which spectral efficiency derived for various uplink power control techniques are compared in accordance with one embodiment.

DETAILED DESCRIPTION

Figure 3:
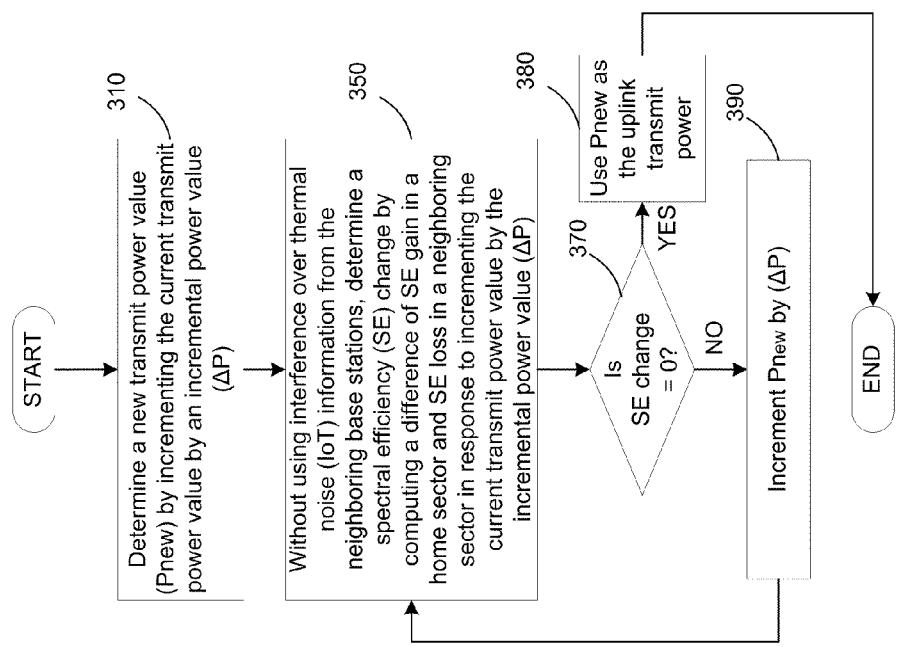
FIG. 3 is a flow-chart, which depicts a maximum sector throughput technique in accordance with one embodiment.

The following description describes embodiments of an uplink power control schemes in broadband wireless networks. In the following description, numerous specific details such as transceiver implementations, resource partitioning, or sharing, or duplication implementations, types and interrelationships of system components are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one embodiment, a uplink power control technique referred to as maximum sector throughput (MST) technique may be used to maximize the sector throughput and cell edge user throughput. In one embodiment, the MST technique may provide uplink power control without using interference over thermal (IoT) noise. In one embodiment, the MST technique may determine spectral efficiency $SE_{Gain}$ for mobile nodes in the home sector after determining a new transmit power ($P_{New}$) by incrementing a current transmit power value ($P_0$) by an incremental transmit power value ($\Delta P$) using a slow fading technique to determine signal to interference plus noise ratio (SINR). In one embodiment, the SINR may be determined without using instantaneous channel realization, which may be estimated in advance, which may require substantial computational resources and cause processing delay.

In one embodiment, $SE_{Loss, E}$ may be determined in a virtual neighboring sector that may represent an aggregate of interferences suffered by the neighboring sectors (1 to N) in response to increasing the transmit power of the home mobile node. In one embodiment, the $SE_{Loss, E}$ may be determined without using downlink preambles sent from the neighboring base stations (BS) and noise plus interference level (NI) exchanged and broadcasted among neighboring BS. In one embodiment, the $SE_{Gain}$ and $SE_{Loss, E}$ may be used to determine an optimal power $P_{Tx}^{opt}$ to maximize the overall throughput. In one embodiment, the $SE_{Gain}$ and $SE_{Loss, E}$ may be further used to enhance cell edge throughput as well.

Figure 1:
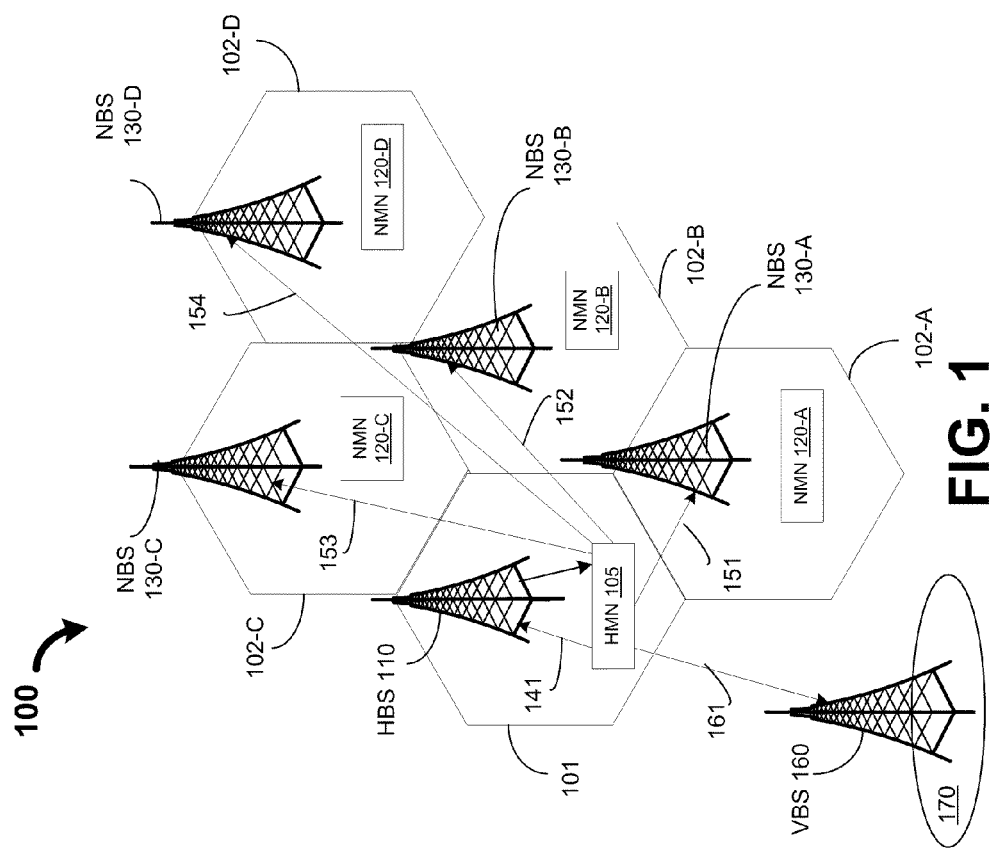
FIG. 1 illustrates an environment 100, which may support maximum sector throughput technique to maximize sector throughput and cell edge throughput in accordance with one embodiment.

An embodiment of an environment 100 in which maximum sector throughput (MST) technique may be used to maximize sector throughput and cell-edge throughput is illustrated in FIG. 1. In one embodiment, the environment 100 may comprise home sector 101, neighboring sectors 102-A to 102-D, and a virtual sector 170. In one embodiment, the home sector 101 may include a home mobile node (HMN) 105. In one embodiment, the HMN 105 may include a cell phone, smart phone, personal digital assistant (PDA), mobile internet devices (MIDs), laptops, and such other computing systems. In one embodiment, the sector 101 is shown comprising a cell phone 105 as an example. In one embodiment, the HMN 105 may represent any device, which may support wireless technologies such as third generation partnership project (3GPP), worldwide interoperability for microwave access (WiMAX), and long term evolution (LTE).

In one embodiment, the HMN 105 may use a variety of multiple access techniques such as frequency division multiplexing (FDM), time division multiplexing (TDM), coded division multiplexing (CDM), orthogonal frequency division multiplexing (OFDM), and single carrier frequency division multiplexing (SC-FDM) and others. In one embodiment, the HMN 105 may be coupled to a home base station HBS 110. In one embodiment, the home sector 101 may be surrounded by neighboring sectors 102-A to 102-D, which may, respectively, comprise neighboring mobile nodes 120-A to 120-D. In one embodiment, the neighboring mobile nodes 120-A to 120-D may be, respectively, coupled to neighboring base stations NBS 130-A to 130-D.

In one embodiment, the HMN 105 may be provided with a current transmit power value ($P_0$) to transmit information packets to a destination mobile node provisioned either within the home sector 101 or the neighboring sectors 102-A to 102-D. In one embodiment, the HMN 105 may send the information packets to the HBS 110. In one embodiment, to enhance the uplink performance such as sector throughput and cell edge throughput within the home sector 101, the uplink transmit power may be increased by incrementing the current transmit power value ($P_0$) by a incremental power value ($\Delta P$) to cause a new transmit power value ($P_{New}$). However, increasing the uplink transmit power value to a new transmit power value ($P_{New}$) may cause interference to NMN 120-A, 120-B, 120-C and 120-D, which may be operating in a same frequency channel in the neighboring sectors 102-A to 102-D, respectively, and may decrease the link performance in the neighboring sectors 102-A to 102-D.

In one embodiment, the MST technique described below may be used to balance link performances in the home sector 101 and neighboring sectors 102 to maximize overall sector throughput and cell edge throughput. In one embodiment, to predict the effective $SE_{Loss, E}$ in all neighboring sectors 102, a virtual sector such as the virtual sector 170 may be used. In one embodiment, the aggregate of interferences caused by the new transmit power value ($P_{New}$) on the base station VBS 160 may provide an estimate of effective $SE_{Loss, E}$.

Figure 2:
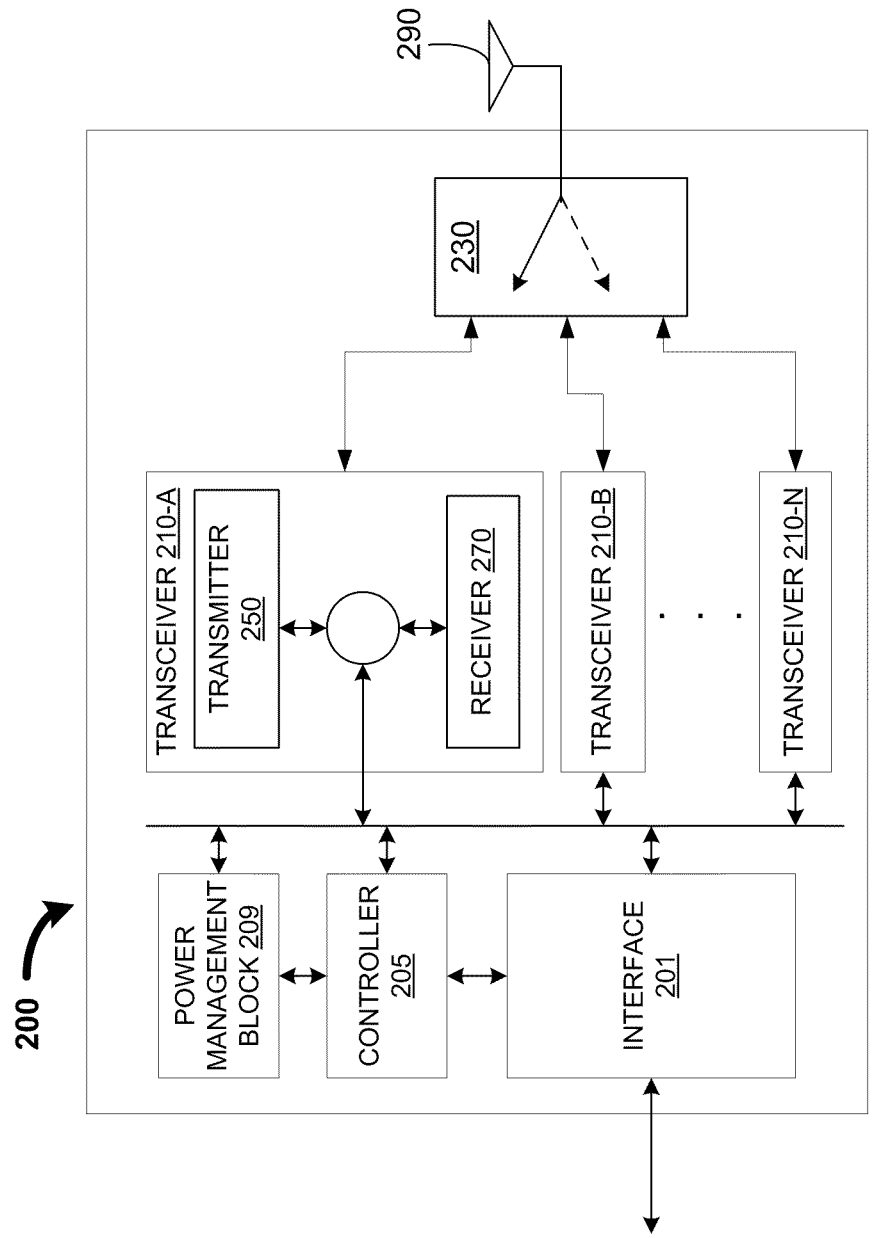
FIG. 2 illustrates a block diagram of a mobile node, which may support simplified maximum sector throughput (SMST) and generalized maximum sector throughput (GMST) techniques to maximize sector throughput and cell edge throughput in accordance with one embodiment.

An embodiment of the HMN 105, which may support techniques to maximize sector throughput and cell edge throughput is illustrated in FIG. 2. In one embodiment, the HMN 105 may comprise an interface 201, a controller 205, a power management block 309, one or more transceivers 210-A to 210-N, a switch 230, and an antenna 290. In one embodiment, the block diagram 200 may be a provisioned as a portion of a network interface card in other scenarios such as a computer platform, a laptop computer, a mobile internet device, handhelds, smart phones, televisions and such other systems.

In one embodiment, the interface 201 may couple the HMN 105 to the home base station HBS 110. In one embodiment, the interface 201 may provide physical, electrical, and protocol interface between the HMN 105 and the other blocks. In one embodiment, the controller 205 may maintain a track of the transceivers 210 that may be operational. In one embodiment, the controller 205 may control the modulation and demodulation techniques selected by the transceivers 210. In one embodiment, the controller 205 may control communication parameters such as the transmission rate, bit error rate, and other such parameters.

In one embodiment, the transceiver 210-A may comprise a transmitter 250 and a receiver 270. In one embodiment, each of the transceiver 210-B to 210-N may comprise a transmitter and receiver similar to the transmitter 250 and the receiver 270 of the transmitter 210-A. In one embodiment, while receiving the signals from the antenna 290, the receivers such as the receiver 270 of the transceivers 210-A to 210-N, may receive the signal from the antenna 290 through a switch 230.

In one embodiment, while transmitting the signals, the transmitters such as the transmitter 250 of the transceivers 210 may provide the radio signal to the antenna 290 through the switch 230.

In one embodiment, the transmitter 250 may receive signals to be transmitted from the controller 205 or directly form the interface 201 under the control of the controller 205. In one embodiment, the transmitter 250 may modulate the signals using techniques such as phase, or amplitude, or frequency modulation techniques. In one embodiment, the transmitter 250 may then transmit the signals to the antenna 290 through the switch 230. In one embodiment, the receiver 270 may receive electrical signals from the antenna 290 and demodulate the signals before providing the demodulated signals to the controller 205 or directly to the interface 201.

In one embodiment, the switch 230 may couple a transmitter of the transmitters 210 to the antenna 290 on time sharing basis, for example. In one embodiment, the switch 230 may couple a specific transceiver 210 to the antenna 290 in response to an event such as a selection control signal of the controller 205. In other embodiment, the switch 230 may be provided with intelligence to couple an appropriate transmitter 210 to the antenna 290. In one embodiment, the switch 230 may couple the antenna 290 to the transmitter 250 while the transmitter 250 may be ready to transmit signals out to a receiver in other system. In one embodiment, the switch 230 may couple the antenna 290 to the receiver 270, while the antenna 290 has generated signals to be provided to the receiver 520. In one embodiment, the antenna 590 may be coupled to a switch 530.

In one embodiment, the power management block 209 may support a MST technique to determine an optimal transmit power to maximize the sector throughput and the cell edge throughput. In one embodiment, the power management block 209 may provide a current transmit power value ($P_0$) to the transmitter 250 to enable the transmitter 250 to transmit information packets. In one embodiment, the value of $P_0$ may be based on a desired link performance. In one embodiment, the power management block 290 may increase the uplink transmit power value by incrementing the current transmit power value ($P_0$) by a incremental power value ($\Delta P$) to cause a new transmit power value ($P_{New}$). However, increasing the uplink transmit power value to a new transmit power value ($P_{New}$) may decrease the link performance in the neighboring sectors 102-A to 102-D by causing interference to NMNs 120-A, 120-B, 120-C and 120-D, which may be operating in a same frequency channel in the neighboring sectors 102-A to 102-D, respectively.

In one embodiment, the power management block 209 may use the MST technique described below to determine an optimal transmit power value, which may balance link performances in the home sector 101 and neighboring sectors 102 to maximize overall sector throughput and cell edge throughput. In one embodiment, the power management block 209 may determine the $SE_{Gain}$ in the home sector 101 and predict the effective $SE_{Loss, E}$ in all neighboring sectors 102 by aggregating the effective interference in a virtual sector 170. In one embodiment, the aggregate of interferences caused by the new transmit power value ($P_{New}$) on the base station VBS 160 may provide an estimate of effective $SE_{Loss, E}$.

A flow-chart 300 depicting an operation of the HMN 105 to maximize sector throughput and cell edge throughput is illustrated in FIG. 3. In block 310, the power management block 209 may determine the new power value ($P_{New}$) by incrementing the current transmit power value ($P_0$) by an incremental power value ($\Delta P$).

In block 350, without using interference over thermal (IoT) noise from the neighboring base stations NBS 102-A to 102-D, the power management block 209 may determine a spectral efficiency change value $SE_{change}$ value. In one embodiment, the power management block 209 may compute the difference between the $SE_{Gain}$ in the home sector 101 and effective $SE_{Loss, E}$ in the neighboring sectors 102-A to 102-D represented as an aggregate or effective interferences in the virtual sector 170 in response to change in transmit power value from $P_0$ to $P_{New}$ (=P0+ΔP). In one embodiment, determining $SE_{Gain}$ and effective $SE_{Loss, E}$ is depicted, respectively, in flow-chart 400 of FIG. 4 and flow-chart 500 of FIG. 5.

In block 370, the power management block 209 may check if the $SE_{change}$ is equal to zero and control passes to block 380 if the $SE_{change}$ has approached zero and to block 390 if the $SE_{change}$ is a positive value. In block 380, the power management block 209 may use the new transmit power value $P_{New}$ as the uplink transmit power value. In block 390, the power management block 209 may use the increment the new transmit power value $P_{New}$ by adding an incremental power value, which may equal ΔP or any other such small value $ΔP_1$ and control passes to block 350.

A flow-chart 400 depicting an operation of the HMN 105 to determine $SE_{Gain}$ is illustrated in FIG. 4. In block 410, the power management block 209 may determine an original Signal to Interference plus Noise Ratio ($SINR_{Orig}$) using a slow fading technique without collecting the instantaneous channel realization values. In one embodiment, the parameters that may be used to determine the $SE_{Gain}$ may be as follows:

1) Channel Loss: The mobile node such as HMN 105 may enter a network (for example, by entering the home sector 101) and the channel loss between the HMN 105 and the HBS 110 may equal $CL_0$ represented by 141 and the channel loss between the HMN 105 and the neighboring NMS may equal $CL_i$ (wherein 'i' may equal 120-A, 120-B, 120-C, 120-D, ... 120-N) represented by 151, 152, 153, and 154. In one embodiment, the channel loss 151 may be determined using a downlink preamble received from the NBS 130-A. Likewise, the channel loss 152, 153, and 154 may be determined using downlink preambles received from the NBS 130-B, NBS 130-C, and NBS 130-D, respectively.

2) Noise plus Interference level (NI): At each neighboring base station, the NI may be estimated as sum power of noises and interferences at that neighboring base station. For example, the NI_130-A at NBS 130-A may be estimated using the information exchanged among the NBS 130 through a network backhaul. In one embodiment, the NI may be expressed in terms of Interference over Thermal (IoT) noise and noise in that sector as shown below in Equation (1):

$$NI = IoT \times P_{Noise} + P_{Noise} \qquad \text{Equation (1)}$$

However, determining Channel Loss and NI may consume substantial computational resources and cause delay as well.

In one embodiment, the power management block 209 may determine the $SE_{Gain}$ in response to increasing the uplink transmit power value to $P_{New}$. In one embodiment, the $SE_{Gain}$ in the home sector 101 may be given by the Equation (2) below:

$$SE_{Gain} = \log(1 + SINR_{New}) - \log(1 + SINR_{Orig}) = \log\{(1 + SINR_{New})/(1 + SINR_{Orig})\} \qquad \text{Equation (2)}$$

In one embodiment, the power management block 209 may use a slow fading technique to compute $SINR_{New}$ and $SINR_{Orig}$ and the resulting $SE_{Gain}$ may be substantially accurate based on the stochastic average. In one embodiment, the $SINR_{Orig}$ (the signal plus interference noise ratio in the home sector 101) before increasing the current power value to a new power value may be given by Equation (3) below:

$$SINR_{Orig} = (P_0/CL_0)/NI_0 \qquad \text{Equation (3)}$$

In block 440, the power management block 209 may determine $SINR_{New}$ after incrementing $P_0$ by ΔP to cause the new transmit power value $P_{New}$ (=$P_0$+ΔP) using slow fading technique and without using instantaneous channel realization values. In one embodiment, the $SINR_{New}$ (the signal plus interference noise ratio in the home sector 101) after increasing the current power value to a new power value $P_{New}$ may be given by Equation (4) below:

$$SINR_{New} = \{(P_0 + \Delta P)/CL_0)/NI_0\} \qquad \text{Equation (4)}$$

In block 480, the power management block 209 may determine $SE_{Gain}$, using $SINR_{New}$, and $SINR_{Orig}$ determined, respectively, in Equations (3) and (4). In one embodiment, the $SE_{Gain}$ may be given by Equation (5) below:

$$SE_{Gain} = \log\{(1 + SINR_{New})/(1 + SINR_{Orig})\}$$

$$= \log\{[1 + (P_{New}/CL_0 \times NI_0)]/[1 + (P_0/CL_0 \times NI_0)]\}$$

$$= \log\{1 + [(\Delta P/CL_0)]/[NI_0 + (P_0/CL_0)]\} \qquad \text{Equation (5)}$$

A flow-chart 500 depicting an operation of the HMN 105 to determine effective $SE_{loss, E}$ is illustrated in FIG. 5. In block 510, the power management block 209 may determine an equivalent channel loss ($CL_E$) from the HMN 105 to the virtual sector 170, which may suffer aggregate interferences in the neighboring sectors 102-A to 102-D caused by providing $P_{New}$ to HMN 105.

To predict the channel loss in the neighboring sectors 102, the power management block 209 may need 1) Channel Loss from HMN 105 to each of the NBS 130-A to 130-D; (2) NI for each of the NBS 130-A to 130-D; and (3) uplink transmit power of each NMN 120-A to 120-D provisioned in the neighboring sectors 102-A to 102D, respectively. However, to obtain channel loss in each sector, the downlink preamble sent from each NMN 120-A to 120-D may be used. Also, $NI_i$ may be first exchanged between the NBS 130-A to 130-D and then broadcasted. To obtain channel loss ($CL_i$) and ($NI_i$) for each NBS 130-A to 130-D, a complex hardware may be needed in addition to incurring high feedback overhead and computationally intensive operations. Also, it may be unrealistic to obtain the uplink transmit power value of the NMN 120-A to 120-D, as the NMN 120-A to 120-D may be attempting to increment the uplink transmit power values.

In one embodiment, to overcome the above disadvantages, the power management block 290 may determine the equivalent channel loss ($CL_E$) from the HMN 105 to the virtual sector 170 (or VBS 160) and $CL_E$ may be given by Equation (6) below:

$$\text{Interference} = P_0/CL_E = \Sigma_{(i=1 \text{ to } N)} P_0/CL_i$$

$$\rightarrow CL_E = (\Sigma_{(i=1 \text{ to } N)} 1/CL_i)^{-1} \qquad \text{Equation (6)}$$

In one embodiment, the following approximations may be made before determining $SE_{Loss, E}$:

Approximation (1): The equivalent channel loss ($CL_E$) may be determined by estimating the CINR for downlink preamble as compared to determining the channel loss (CLi) for each NBS 130-A to 130-D.

Approximation (2): Also, effective signal to noise ratio ($SNR_E$) in the virtual sector 170 may be substantially same as the average signal to noise ratio ($SNR_{Avg, home_s}$) in the home sector 101 as the average SNR levels in the different sectors 102-A to 102-D may not vary at all or may vary little to be significant. In one embodiment, the relationship between the $SNR_E$ and $SNR_{Avg\,home}$ is as shown in Equation (7) below:

$$SNR_E = SNR_{Avg,\,home} \qquad \text{Equation (7)}$$

Approximation (3): Also, effective noise plus interference ratio ($NI_E$) in the virtual sector 170 may be approximated to noise plus interference ratio ($NI_0$) in the home sector 101. In one embodiment, the relationship between the $NI_E$ and $NI_0$ is as shown in Equation (8) below:

$$NI_E = NI_0 \qquad \text{Equation (8)}$$

In block 540, the power management block 209 may determine an equivalent original SINR ($SINR_{E,\,Orig}$) without determining the channel loss (CLi) for each neighboring sector 102-A to 102-D individually and without using the $NI_i$ information from the neighboring sectors 102-A to 102-D. In one embodiment, the $SINR_{E,\,Orig}$ (the effective signal plus interference noise ratio in the virtual sector 170) before increasing the current power value to a new power value may be given by Equation (9) below:

$$SINR_{E,\,Orig} = (SNR_E * P_{Noise})/NI_E \qquad \text{Equation (9)}$$

In block 550, the power management block 209 may determine $SINR_{E,\,New}$ at the virtual sector 170 (or VBS 160) after incrementing $P_0$ by $\Delta P$ to cause the new transmit power value $P_{New}$ ($=P_0+\Delta P$). In one embodiment, the $SINR_{E,\,New}$ (the signal plus interference noise ratio in the virtual sector 170) after increasing the current power value to a new power value $P_{New}$ may be given by Equation (10) below:

$$SINR_{E,\,New} = \{(SNR_E * P_{Noise})/(NI_E + \Delta P/CL_E)\} \qquad \text{Equation (10)}$$

In block 580, the power management block 209 may determine an equivalent $SE_{Loss,\,E}$ using $SINR_{E,\,New}$ and $SINR_{E,\,Orig}$ determined, respectively, in Equations (9) and (10). In one embodiment, the $SE_{Loss,\,E}$ may be given by Equation (11) below:

$$SE_{Loss,\,E} = \log\{(1+SINR_{E,\,New})/(1+SINR_{E,\,Orig})\}$$

$$= \log\{[1+(SNR_E*P_{Noise})/NI_E]/[1+(SNR_E*P_{Noise})/(NI_E+\Delta P/CL_E)]\}$$

$$= \log\{[1+(SNR_{Avg,home}*P_{Noise})/NI_0]/[(SNR_{Avg,home}*P_{Noise})/(NI_0+\Delta P/CL_E)]\} \qquad \text{Equation (11)}$$

In one embodiment, the power management block 209 may determine the optimal transmit power P(Optimal). In one embodiment, if the increase in $P_{New}$ leads to a positive $SE_{change}$, the overall sector throughput may increase and the current power value may be incremented until a negative $SE_{change}$ may be anticipated. In one embodiment, the optimal transmit power P(Optimal) may be achieved while $SE_{change}$ equals zero and $\Delta P$ tends to zero. In one embodiment, the $SE_{change}$ may be given by Equation (12) below:

$$SE_{change} = SE_{Gain} - SE_{Loss} = 0 \quad (\Delta P \to 0)$$

$$P(\text{Optimal}) = \log\{1+[(\Delta P/CL_0)/(NI_0+P_0/CL_0)]\}$$

$$= \log\{[1+(SNR_E*P_{Noise})/NI_E]/[1+(SNR_E*P_{Noise})/(NI_E+\Delta P/CL_E)]\}$$

$$P(\text{Optimal}) = [CL_E \times NI_0 \times (NI_0+SNR_{Avg,home} \times P_{Noise})/SNR_{Avg,home} \times P_{Noise})] - CL_0 \times NI_0 \qquad \text{Equation (12)}$$

In one embodiment, the uplink power control technique discussed above may be referred to Simplified Maximum Sector Throughput (SMST) technique. In one embodiment, a Generalized Maximum Sector Throughput (GMST) technique may be derived from Equation (12) above.

$$[P(\text{Optimal})/CL_0 \times NI_0] = (CL_E/CL_0) \times [1+(1/SNR_{Avg,home} \times P_{Noise}/NI_0)] - 1,$$

$$= SINR_{Target} = \{CINR_{Preamble} \times [1+(1/SINR_{Avg,home})] - 1\} \qquad \text{Equation (13)}$$

wherein $CINR_{Preamble} = (CL_E/CL_0)$; $SINR_{Target} = [P(\text{Optimal})/CL_0 \times NI_0]$; and $SINR_{Avg,home} = (SNR_{Avg,home} \times P_{Noise}/NI_0)$. From Equation (13), it may be seen that GMST technique may be based on $SINR_{Target}$. In one embodiment, a carrier to interference plus noise ratio for a downlink preamble ($CINR_{Preamble}$) maybe used to measure the tradeoff between channel loss compensation for home sector 101 and neighboring sectors 102-A to 102-D IoT control. In one embodiment, as the $SINR_{Target}$ may rely on CINR of downlink preamble, the power management block 209 may not estimate individual $CL_i$, which may reduce the complexity of the GMST technique substantially.

Also, in one embodiment, the $SINR_{Target}$ may have a fixed relationship with the $CINR_{Preamble}$ and as an extension other tunable parameter coefficients may be used. In one embodiment, the Equation (14) below may provide an expression for a Generalized Maximum Sector Throughput (GMST) technique.

$$SINR_{Target} = \beta \times (CINR_{Preamble})^\gamma + \alpha \qquad \text{Equation (14)}$$

wherein 'γ' (gamma) may be used for fractional channel loss compensation. By comparing, Equation (13) and Equation (14), it may be seen that SMST technique may be a particular case of GMST technique with α (alpha)=−1, β (beta)=1+(1/$SINR_{Avg,home}$), and γ=1. In one embodiment, the GMST technique may achieve improved cell-edge throughput by tuning the parameter set (α, β, γ).

In one embodiment, a low value of $SINR_{Target}$ may reduce the throughput of users at the edge of the cell and a high value of $SINR_{Target}$ may increase the interference in neighboring sectors. In one embodiment, to improve the cell-edge throughput the $SINR_{Target}$ may be limited as shown in Equation (15) below:

$$SINR_{Min} \leq SINR_{Target} \leq SINR_{Max} \qquad \text{Equation (15)}$$

From Equation (13), the $SINR_{Target}$ may be determined as shown in Equations (16) and (17) below:

$$SINR_{Target} = \text{Max}\{SINR_{Min}, CINR_{Preamble} \times [1+(1/SINR_{Avg,home})] - 1\} \qquad \text{Equation (16)}$$

$$SINR_{Target} = \text{Min}\{SINR_{Max}, CINR_{Preamble} \times [1+(1/SINR_{Avg,home})] - 1\} \qquad \text{Equation (17)}$$

wherein $SINR_{Min}$ and $SINR_{Max}$ may represent design parameters, which may be used to adjust the tradeoff between sector throughput and cell-edge throughput. In one embodiment, the power management block 209 may use SINR limitation and IoT control to improve the cell-edge throughput further. In one embodiment, the IoT level to the virtual sector 170 may be limited to be within a specific range and the limiting range is depicted in Equation (18) below:

$$(P_{New}/CL_i \times P_{Noise}) \leq IoT_{Limit} \to P\text{New} \leq (CLi \times P_{Noise} \times IoT_{Limit}) \qquad \text{Equation (18)}$$

wherein $IoT_{Limit}$ may be used as another tunable parameter while designing a communication system.

Figure 7:
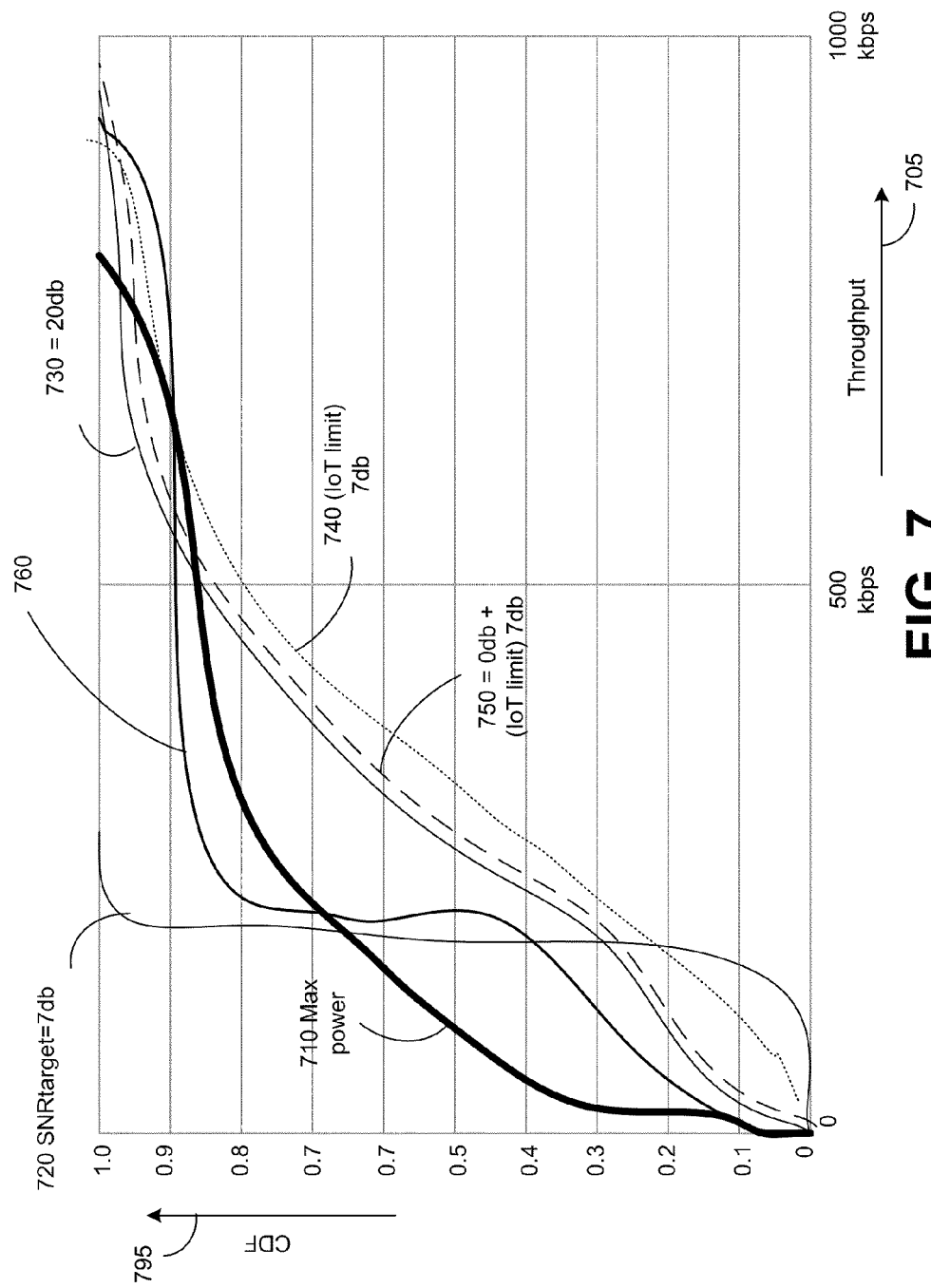
FIG. 7 is a graph 700, which depicts a relationship between cumulative density function (CDF) and throughput in accordance with one embodiment.

A table 600 includes a list of parameter-value combination that may be used to evaluate the performance of the SMST and GMST techniques in accordance with one embodiment. In one embodiment, the table 600 may comprise two columns—parameter list 610 and value 650. In one embodiment, the parameter list 610 and the corresponding values 650 may comprise bandwidth (=10 Mhz) for each sector, frequency reuse (=1), cell deployment (=3 sectors and 19 cell wrap-around), number of users (10/sector), number of strong interference (=8), channel model (=E-ITUPed B 3 km/h), permutation mode (=WiMax UL), Uplink symbols (=15), and the site-to-site distance (=500 meters). In one embodiment, using the above listed parameters and the values, the following techniques may be evaluated:

T1: Maximum power technique: All mobile nodes 105 and 120-A to 120-D may use full power without any power control mechanism;

T2: SNR-target based technique: Power may be set such that the received SNR at the base stations may attain a predefined target i.e., $P_0 = SNR_{Target} \times P_{Noise} \times CL_0$, wherein $SNR_{Target} = 7$ db;

T3: SMST+$SINR_{Min}$+$SINR_{Max}$ technique: wherein $SINR_{Min} = 0$ db and $SINR_{Max} = 20$ db;

T4: SMST+$IoT_{Limit}$ technique: wherein $IoT_{Limit} = 7$ db;

T5: SMST+$SINR_{Min}$+$IoT_{Limit}$ technique: wherein $SINR_{Min} = 0$ db and $IoT_{Limit} = 7$ db;

T6: GMST technique: wherein α (alpha)=−0.9, β (beta)=−0.64, and γ (gamma)=0.9;

A graph 700 depicting a relationship between the cumulative density function (CDF) and throughput for the above listed techniques T1 to T6 is illustrated in FIG. 7. In one embodiment, the throughput in kilobytes per second (kbps) may be plotted along the x-axis 705, and the CDF may be plotted along the Y-axis 795. In one embodiment, the plot 710, 720, 730, 740, 750, and 760 illustrate a relationship between CDF and throughput while using techniques T1 to T6, respectively. As depicted in the plots, the plot 760 for a GMST technique provides maximum CDF and throughput and plots SMST based techniques with $SINR_{Min}$ and $SINR_{Max}$ limitations combined with $IoT_{Limit}$ may provide substantially similar CDF and throughput values as may be seen from plots 730, 740, and 750. However, from plot 710, the maximum power technique may provide lesser throughput as compared to SMST based technique and GMST technique. The plot 720 based on SNT Target may provide high CDF response but very low throughput. In one embodiment, the SMST based techniques (T3, T4, and T5) and GMST technique T6 may be used to achieve maximum sector throughput and cell-edge throughput as well as compared to maximum power technique and $SNR_{Target}$ techniques.

A table 800 depicting a spectral efficiency (SE) comparison chart for sector and cell-edge conditions achieved using the techniques T1 to T6 is illustrated in FIG. 8. In one embodiment, the table 800 may comprise three columns—uplink power control (ULPC) technique 810, Sector SE 850, and 5% cell-edge SE 880. In one embodiment, the ULPC technique 810 may comprise techniques T1 to T6 listed above and the corresponding values of throughput in bits per second per Hertz for sector SE and cell-edge SE may be provided, respectively, in columns Sector SE 850 and 5% cell-edge SE 880.

In one embodiment, for $SNR_{Target}$ technique, the cell-edge SE equaling 0.0369 (and throughput=141.3 kbps) may be maximum, however, the sector SE equals 0.4294 (and throughput=1.6444 Mbps), which may be lowest compared to other techniques. In one embodiment, for maximum power technique, the sector SE 850 may comprise a value of 0.5787 (and throughput=2.2163 Mbps) and cell-edge SE may equal 0.005 (throughput=19.3 kbps). In one embodiment, for SMST based techniques T3 to T5, the sector SE values may equal 0.7486 (throughput=2.867 Mbps), 0.7609 (throughput=2.9142 Mbps), and 0.7247 (throughput=2.7754 Mbps) and cell-edge SE may equal 0.0199 (throughput 76.3 kbps), 0.0082 (throughput=31.5 kbps), and 0.0216 (throughput=82.6 kbps). In one embodiment, for SMST based techniques T3 to T5, both the sector SE (and the throughput) and the cell-edge SE (and the throughput) may be optimal compared to it techniques T1 and T2. In one embodiment, for the GMST technique, the sector SE may equal 0.6426 (throughput=2.4612 Mbps) and cell-edge SE may equal 0.0339 (throughput may equal 129.8 kbps).

In one embodiment, the maximum power technique may result in lowest cell-edge throughput (=19.3 kbps) as interference may be out of control. In one embodiment, the $SNR_{Target}$ technique may provide highest cell-edge throughput (=141.3 kbps) but at the cost of sector throughput (=1.6444 Mbps) as mobile nodes 105 and 120-A to 120-D may be forced to limit the maximum power to reduce interference. In one embodiment, the SMST based techniques T3 to T5 may achieve highest sector throughputs of 2.867 Mbps, 2.9142 Mbps, and 2.7754 Mbps, respectively. However, the cell-edge throughputs of 76.3 kbps, 31.5 kbps, and 62.6 kbps may be higher compared to the throughput for maximum power technique. In one embodiment, the GMST technique may provide an optimal sector throughput and cell-edge throughput.

Figure 9:
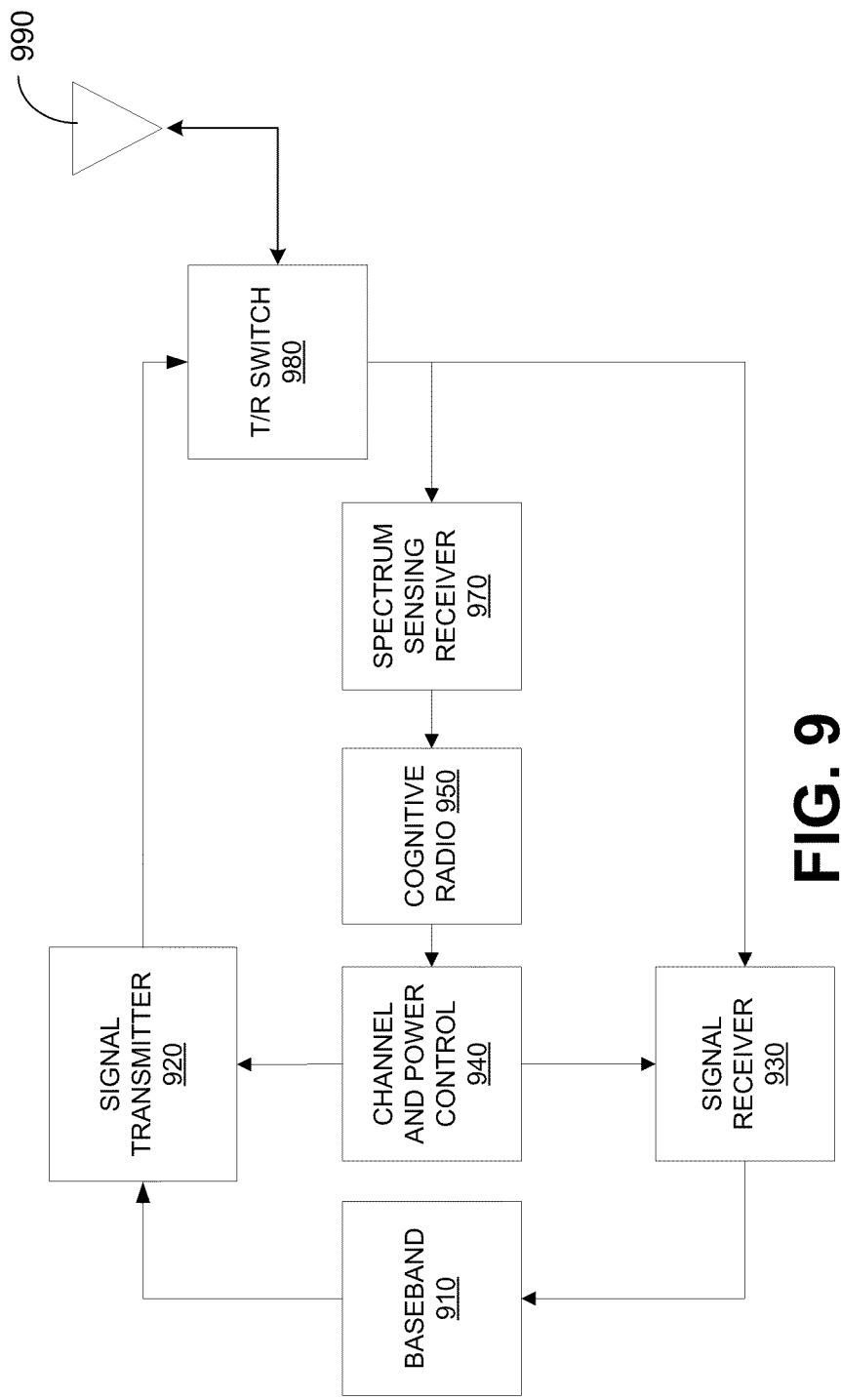
FIG. 9 illustrates a radio system 900, which may support the uplink power control schemes in accordance with one embodiment.

An embodiment of a cognitive radio system 900, which may support SMST and GMST techniques to maximize sector and cell-edge throughput is illustrated in FIG. 9. In one embodiment, the cognitive radio system 900 may comprise a baseband 910, a signal transmitter 920, a signal receiver 930, a channel and power control block 940, a cognitive radio 950, a spectrum sensing receiver 970, a T/R switch 980, and an antenna 990.

In one embodiment, the antenna 990 may provide a wide frequency band. Such an approach may enable the antenna 990 to be used for transmitting and receiving signals processed using technologies such as Wi-Fi, WI-MAX, UMG, UWB, television signals, and such other similar signals. In one embodiment, while receiving signals, the antenna 990 may be provided the signals to the T/R switch 980. In one embodiment, while transmitting signals, the antenna 990 may transmit the signals received from the signal transmitter 920. In one embodiment, the T/R switch 980 may comprise intelligence to switch between the signal transmitter 920 and the signal receiver 930.

In one embodiment, the spectrum sensing receiver 970 may detect unutilized portions (holes) of the spectrum and use the holes to meet the demand of the spectrum. In one embodiment, the cognitive radio 950 may receive sensing signals from the spectrum sensing receiver 970 and may generate information on the channels that may be used. In one embodiment, the cognitive radio 950 may provide such information to the channel and power control 940.

In one embodiment, the channel and power control 940 may control the channels and the power consumed by the channels by controlling the signal transmitter 920 and the signal receiver 930. In one embodiment, the power control 940 may support SMST and GMST techniques to provide optimal uplink transmit power to maximize sector throughput and cell-based throughput as described above. In one embodiment, the power control 940 may perform functions as described with reference to the power management block 209 above.

In one embodiment, the signal transmitter 920 may receive signals from the baseband 910 and may modulate the signals using techniques such as phase, amplitude, frequency, and orthogonal frequency division (OFDM) modulation techniques. In one embodiment, the signal receiver 930 may receive signals from the antenna 990 and may demodulate the signals before providing the demodulated signals to the baseband 910. In one embodiment, the baseband 910 may receive signals from the processing blocks of the system and may perform baseband processing before sending the signals to the signal transmitter 920. In one embodiment, the baseband 910 may receive demodulated signals from the signal receiver 930 and may perform baseband processing before providing the signals to the processing blocks of the system 900.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus to support uplink power control technique, comprising:
   a transmitter coupled to a channel by an uplink, and
   a power management block coupled to the transmitter,
   wherein the power management block is to determine an optimal uplink power value without collecting interference over thermal (IoT) noise from a plurality of neighboring sectors,
   wherein the optimal uplink power value is to cause an optimal sector throughput and cell-edge throughput; and
   wherein the power management block is to use a simplified maximum sector throughput (SMST) technique to determine the optimal uplink power value, wherein the SMST technique includes determining an equivalent spectral efficiency loss ($SE_{Loss, E}$) in a virtual sector.

2. The apparatus of claim 1, wherein the power management block is to generate a new power value by incrementing a current power value by an incremental power value until the new power value reaches the optimal uplink power value.

3. The apparatus of claim 2, wherein the SMST technique includes determining a spectral efficiency gain ($SE_{Gain}$) in a home sector in which the mobile node is located and the $SE_{Loss, E}$ in the virtual sector in response to the new power value, wherein a spectral efficiency change is equal to a difference in the $SE_{Gain}$ and the $SE_{Loss, E}$.

4. The apparatus of claim 3, wherein the power management block is to increment the current power value by the incremental power value until the spectral efficiency change is equal to zero and the incremental power value tends to zero.

5. The apparatus of claim 3, wherein the power management block is to determine the $SE_{Gain}$ using an original signal to interference plus noise ratio ($SINR_{Orig}$) and a new signal to interference plus noise ratio ($SINR_{New}$), wherein $SINR_{Orig}$ is determined before incrementing the current power value and the $SINR_{New}$ is determined after incrementing the current power value.

6. The apparatus of claim 5, wherein the $SINR_{Orig}$ and the $SINR_{New}$ is determined using a slow fading technique and without using instantaneous channel realization values.

7. The apparatus of claim 3, wherein the power management block is to determine the $SE_{Loss, E}$ using an equivalent channel loss ($CL_E$) in the virtual sector, wherein the $CL_E$ is representative of aggregate channel losses in the plurality of neighboring sectors.

8. The apparatus of claim 7, wherein the $CL_E$ is an estimate of a carrier to interference plus noise ratio ($CINR_{Preamble}$) of downlink preamble.

9. The apparatus of claim 2, wherein the power management block is to use a generalized maximum sector throughput (GMST) technique to determine the optimal uplink power value, wherein the GMST technique is based on a signal to interference plus noise ratio ($SINR_{Target}$) target.

10. The apparatus of claim 9, wherein the $SINR_{Target}$ has a linear relationship with a carrier to interference plus noise ratio ($CINR_{Preamble}$) of downlink preamble, wherein the GMST technique includes tunable parameter coefficients to enhance the sector throughput and cell-edge throughput.

11. A method to support uplink power control technique in a mobile node, comprising:
   generating a new power value by incrementing a current power value by a first incremental value,
   determining a spectral efficiency gain ($SE_{Gain}$) in a home sector in which the mobile node is located,
   determining an effective spectral efficiency loss ($SE_{Loss, E}$) in neighboring sectors surrounding the home sector without computing individual channel loss in the neighboring sectors and without collecting noise plus interference (NI) level from the neighboring sectors,
   checking if the new power value generates an improvement in overall link performance, and
   accepting the new power level as an optimal transmit power level if further incrementing of the new power level causes deterioration of the overall link performance.

12. The method claim 11, wherein the uplink power control technique includes a simplified maximum sector throughput (SMST) technique, wherein determining the $SE_{Loss, E}$ includes determining an equivalent channel loss ($CL_E$) in a virtual sector that is representative of interferences suffered by the neighboring sectors in response to the new power value.

13. The method of claim 12 comprises determining a spectral efficiency change as a difference in the $SE_{Gain}$ and the $SE_{Loss, E}$.

14. The method of claim 13 comprises determining the $SE_{Gain}$ by using an original signal to interference plus noise ratio ($SINR_{Orig}$) and a new signal to interference plus noise ratio ($SINR_{New}$), wherein $SINR_{Orig}$ and the $SINR_{New}$ is determined independent of estimation of instantaneous channel realization.

15. The method of claim 14, wherein the $SINR_{Orig}$ and the $SINR_{New}$ is determined using a stochastic average based slow fading technique.

16. The method of claim 12, wherein the $CL_E$ is an estimate of a carrier to interference plus noise ratio ($CINR_{Preamble}$) of downlink preamble.

17. The method of claim 11, wherein improving the link performance includes increasing sector throughput and cell-edge throughput.

18. The method of claim 11, wherein the uplink power control technique includes a generalized maximum sector throughput (GMST) technique to determine the new power value to improve sector throughput and cell-edge throughput, wherein the GMST technique is based on a signal to interference plus noise ratio ($SINR_{Target}$) target.

19. The method of claim 18, wherein the $SINR_{Target}$ has a linear relationship with a carrier to interference plus noise ratio ($CINR_{Preamble}$) of downlink preamble.

20. The method of claim 18, wherein the GMST technique includes tunable parameter coefficients, wherein the tunable parameter coefficients include a first parameter to compensate fractional channel loss.

\* \* \* \* \*

UNITED STATES PATENT AND TRADEMARK OFFICE
CERTIFICATE OF CORRECTION

PATENT NO. : 8,433,359 B2  
APPLICATION NO. : 12/630673  
DATED : April 30, 2013  
INVENTOR(S) : Rongzhen Yang et al.

It is certified that error appears in the above-identified patent and that said Letters Patent is hereby corrected as shown below:

In the Drawings:

Sheet 5 of 6, in Figure 7, line 1, delete "SNRtarget" and insert -- $SNR_{target}$ --, therefor.

In the Claims:

In column 12, line 26, in claim 12, delete "method claim" and insert -- method of claim --, therefor.

Signed and Sealed this  
Thirteenth Day of August, 2013

Teresa Stanek Rea  
*Acting Director of the United States Patent and Trademark Office*